United States Patent [19]

Miller et al.

[11] Patent Number: 4,707,644
[45] Date of Patent: Nov. 17, 1987

[54] AUXILIARY STARTING FOR ELECTRIC MOTORS

[75] Inventors: John W. Miller, St. Paul; Melvin F. Mittelmark, Minneapolis; Roger N. Schmidt, Plymouth, all of Minn.

[73] Assignee: Honeywell Inc., Minneapolis, Minn.

[21] Appl. No.: 262,564

[22] Filed: May 11, 1981

[51] Int. Cl.[4] ............................................. H02P 1/00
[52] U.S. Cl. .................................... 318/136; 318/137
[58] Field of Search ............... 318/136, 137, 431, 436; 91/53; 310/41; 417/324, 323, 406, 411, 410

[56] References Cited

U.S. PATENT DOCUMENTS

| | | | |
|---|---|---|---|
| 2,258,159 | 10/1941 | Nardone | 91/53 |
| 2,894,501 | 7/1959 | Duer | 91/53 |
| 3,300,697 | 3/1967 | Woodford | 318/136 |

Primary Examiner—Arthur G. Evans
Attorney, Agent, or Firm—Charles G. Mersereau

[57] ABSTRACT

A fluid-powered auxiliary starting system for electric motors is disclosed which includes an accumulator means for supplying an amount of fluid at high pressure to a fluid-operated motor and a clutch of similar device for connecting the output shaft of the fluid-operated motor to transfer rotational torque to the shaft of the prime mover motor to be started. The system may be either hydraulic or pneumatic and may be used to bring one or more electric motors substantially up to spaced before electric power is applied to the motors themselves. The same motor or a hydraulic or pneumatic pump may be used to recharge the accumulator between uses for electric motor starting.

1 Claim, 3 Drawing Figures

AUXILIARY STARTING FOR ELECTRIC MOTORS

BACKGROUND OF THE INVENTION

1. Field of the Invention

The present invention relates generally to an apparatus for reducing the amount of electric power consumed by large electric motors during startup and, more particularly, to a fluid power auxiliary system for starting such motors.

2. Description of the Prior Art

It is well known that electric motors and, in particular large electric motors connected to relatively heavy prime mover loads such as commercial air conditioning or refrigeration compressors, ventilating fans and the like consume a great deal more electric power when starting and coming up to speed than they do when running at a steady state condition. In addition to the initial power surge or "spike" associated with the initial starting of such motors, which may cause an inrush of power equal to two or three times the power consumed when such a motor is running at constant speed, these motors consume power very inefficiently from the time they are switched on until they are brought up to operating speed. The motors themselves, of course, also must be built with heavy starting windings to accommodate the extra power required for starting.

Many commercial installations have a number of such motors located in close proximity. The wiring network supplying the motors, of course, must be sized to accommodate the initial power surge or spike or other highest rate of power consumption so as to prevent any overloading of the system when the motors are started. These characteristics lead to high initial costs occasioned by the need for heavier wiring in both the supply network and the motors themselves.

Typically, such motors are controlled by temperature sensors or the like and are prone to cycle on and off quite frequently. This increases the percent of operating time which is spent in starting and bringing the motors up to operating speed. Because of the surges and inefficiencies associated with startup, the overall power consumption of the system may be increased significantly. In recent times, the increasing costs of power generally coupled with the increasing requirements for load-shedding during peak power consumption intervals has greatly increased the need for reducing or eliminating power consumption inefficiencies. If the start up surges and operating inefficiencies can be reduced or eliminated a great deal of cost savings can be realized in both the wiring networks and the motors themselves by eliminating the need for allowing for the higher power consumption in the network and the oversized motor windings. In addition, the total average amount of power consumed by the large user can be greatly reduced.

In addition to the recognized increase in power consumption, excessive starting and stopping of electric motors associated with short on-off cycles tends to shorten the life of such motors. This is due to excessive heat build-up in the windings and bearings. In fact, because of this problem, the allowable time between motor starts has to be lengthened beyond that which economically fits the application, in certain cases, to allow the motors to cool properly before being restarted. If such motors could be started by auxiliary means, winding and bearing life could be increased and the necessity for relatively long cooldown periods could be avoided.

Thus, there exists a definite need for an auxiliary motor starting system which operates on a reduced amount of electric power or utilizes stored power which can be released to start such motors and bring them at least partially up to operating speed before the power is turned on to the motors themselves. One prior art system is illustrated and described in U.S. Pat. No. 3,300,697 in which a hydraulic cylinder is used to operate a pawl against a ratchet wheel to start the rotation of a lathe or the like used for machining very heavy workpieces such as steel mill rolls. That system, however, aids in overcoming only the inertia of the stopped spindle where even the full available torque is insufficient to start rotation.

SUMMARY OF THE INVENTION

By means of the present invention, the problems associated with startup inefficiencies of large electric motors is solved by the provision of a fluid-operated auxiliary motor starting system which can be used to start such motors and bring them all or part of the way up to operating speed before applying electric power directly to the motors in a manner which consumes very little electric power. The present invention uses a pressurized fluid system which may be either hydraulic or pneumatic to initiate the rotation of the motor shaft. The system includes an accumulator tank connected by suitable valving with a hydraulic or pneumatic motor which in turn is suitably clutched to the end of the motor shaft not connected to the primary load or prime mover. A small hydraulic pump or pneumatic compressor may be provided to recharge the accumulator tank as required or the electric motor itself used for this purpose by switching the output of the associated hydraulic or pneumatic motor when the prime mover motor is up to operating speed or is coasting to a stop. Any suitable type clutching mechanism and clutch actuating mechanism may be utilized to transfer power from the hydraulic or pneumatic motor shaft to the shaft of the prime mover motor to be started in a well-known manner. For any large installations, a central system may be utilized to start any number of motors as required. The system controls may be made as simple or as sophisticated as desired depending on the particular application involved.

Figure 1:
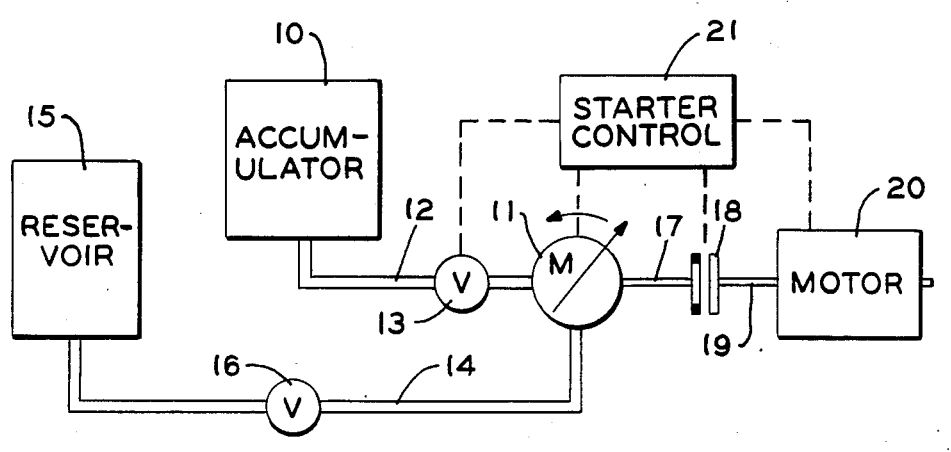
FIG. 1 is a schematic diagram of one embodiment of the invention.

The fluid power schematic diagram of FIG. 1 includes an accumulator tank 10 connected to a reversible fluid operated motor 11, as through a line 12, which is suitably valved at 13. A further conduit 14 connects the reversible motor 11 with a hydraulic fluid reservoir 15 in the case of any hydraulic system, or an air inlet with filter in the case of a pneumatic system. The conduit 14 is suitably valved at 16. The output power shaft 17 of the motor 11 is connected to one side of a suitable clutching mechanism 18, which, in turn, is connected to the shaft 19 of the motor 20 to be started. The motor 20 connects with the prime mover or load (not shown) to be operated by the motor. A starter control 21 is shown connected electrically to motor 11, valve 13, clutching mechanism 18 and motor 20. The starter control may be used to operate the starting system in any desired fashion as in conjunction with a remote temperature sensing device.

The schematic diagram of FIG. 1 represents one concept of the auxiliary motor starting system of the present invention. The charged accumulator tank 10 contains air under high pressure or a suitable amount of hydraulic fluid partially filling the accumulator with an amount of highly pressurized gas above it. When the charged system is not operating to start a motor, valves 13 and 16 are closed and the cluch 18 disconnected from the motor shaft 19. When a signal is received from any associated control device, for example a thermostat indicating that an air-conditioning or a refrigeration compressor should be started, the valves 13 and 16 are opened by starter control 21 and the hydraulic or pneumatic motor 11 operated in a mode so as to apply rotational torque to the output shaft 17 as the clutch 18 is engated. The accumulator may be sized such that the motor 20 may be started and brought substantially up to operating speed before the available stored power is exhausted. During the motor start up, the fluid reserve proceeds from the accumulator through the valves 13, motor 11 and valve 16 to the reservoir 15, in the case of a hydraulic system, or is released to the atmosphere in the case of a pneumatic system.

Once the motor 20 is up to the desired speed, electric power can then automatically be applied to the motor and the clutch 18 disengaged so that the motor then runs on its own. In the system depicted in FIG. 1, the output of the motor 11 may be reversed prior to the disengaging of clutch 18 such that the accumulator may be recharged by the motor 20 in preparation for the next required motor start sequence prior to disengagement of the clutch. After the accumulator has been recharged either with hydraulic fluid from the reservoir 15 or by bringing in outside air, in the case of pneumatic system, until the accumulator has reached the desired pressure which may be sensed in a conventional manner, the valves 13 and 16 are then closed, and clutch 18 disengaged, and the output of the starting motor shifted so that it again becomes a motor instead of a pump.

The valves 13 and 16 may be any conventional fluid tight valve normally associated with such systems and may be solonoid operated. The starting motor 11 may be any suitable hydraulic or pneumatic motor which has a reversible throughput.

Figure 2:
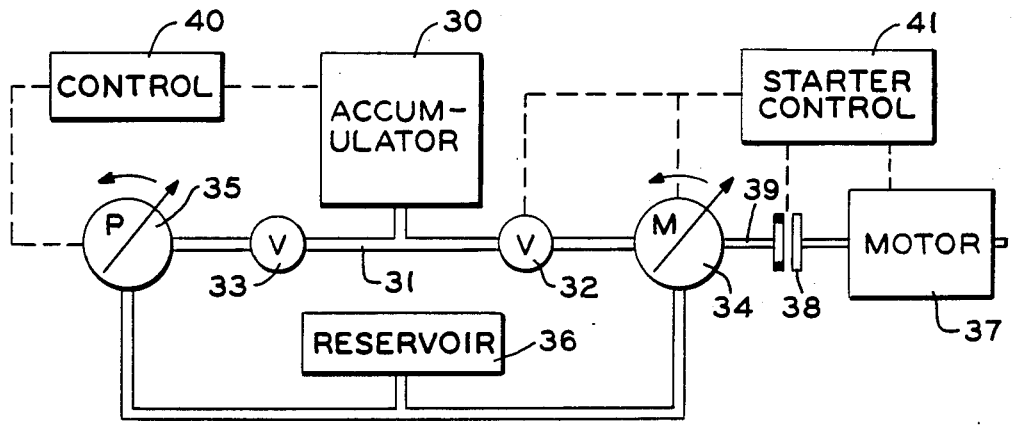
FIG. 2 is a schematic diagram of an alternate embodiment of the invention.

FIG. 2 shows an alterntive embodiment to the system described with respect to FIG. 1. In FIG. 2 there is shown an accumulator 30 connected by a tee to a conduit 31 having valves 32 and 33 connecting respectively with motor 34 and a pump 35. In the case of a hydraulic application, a reservoir 36 is provided. As was the case in the system depicted in FIG. 1, the motor 34 is connected, when desired, with the prime mover motor 37 as by clutch 38 and shaft 39.

The embodiment described with regard to FIG. 2 can be operated in basically the same manner as that described for FIG. 1 with the exception that the auxiliary hydraulic pump 35 is also included in the system. The auxiliary hydraulic or pneumatic pump 35 operated in conjunction with valve 33 is used to pressurize the accumulator 30 between uses of the motor 34 or, in the alternative, actually be used in conjunction with the accumulator 30 to operate the motor 34, if necessary, during starting of the motor 37. A control system depicted at 40 may be utilized to maintain the proper pressure within the accumulator chamber in conjunction with the operation of the hydraulic pump 35 and the valve 33. The pump 35 is shown as being able to operate reversibly and pump to or from the reservoir 36, however, normally the pump 35 is used to charge the accumulator 30. A starting control 41 is also shown which controls the starting of the motor 37 in a manner similar to the embodiment of FIG. 1.

Figure 3:
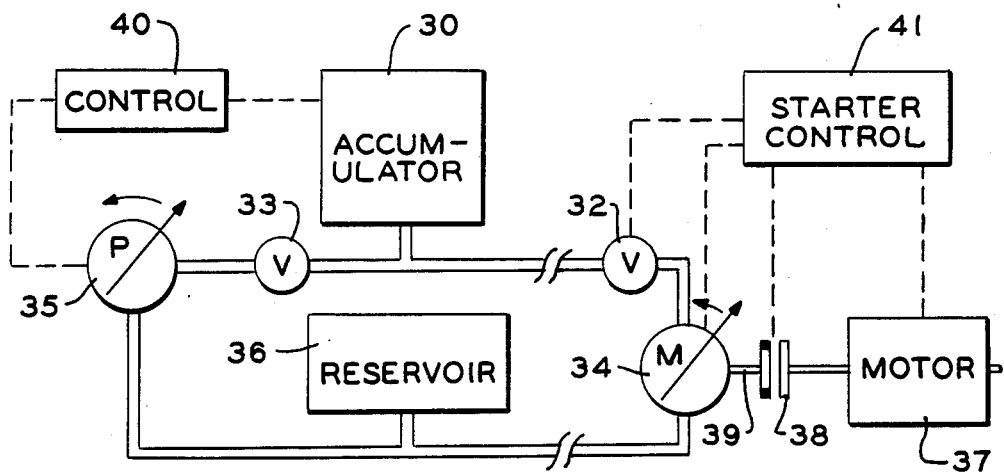
FIG. 3 is a schematic diagram representing yet another embodiment of the invention.

The schematic diagram pictured in FIG. 3 is similar to the system of FIG. 2 but depicting how a plurality of motors may be started from a single hydraulic or pneumatic supply system. It includes a plurality of systems including motors 34 and valves 32 which are supplied in parallel from the hydraulic or pneumatic system such that as many motors as necessary can be started by the system. The size of the accumulator and pump in accordance with FIG. 3, of course, depends upon the number and size of motors to be started and whether interlocks are provided such that not all the associated motors can be started at any one time.

In accordance with the various embodiments of the invention any type of conventional control system may be utilized to coordinate the hydraulic system with the electric motor driving the prime mover. This requires only conventional controls respecting the valving, pumps, motors, clutches and prime mover motors, and in most cases the precise control method and components used will vary depending upon the particular application involved.

It should be noted that the hydraulic or pneumatic pumps 35 used to recharge the system are normally operated when the accumulator pressure falls below a control point. The pumps, of course, use far less power than that utilized by a conventional motor when starting.

Thus, it can be seen that the motor starting system in accordance with the present invention presents a novel and practical system which uses very little electric power in comparison with normal motor starting power consumption. The concept is quite flexible and each system may be designed and sized in accordance with the requirements of the motor or motors to be started. The system allows the prime mover motors to be operated at their peak efficiency whenever they are needed and, therefore both the supply wiring and motor windings may be sized in accordance with normal operating speed power requirements.

In addition, in accordance with the present invention, motor winding and bearing wear may be reduced and the need for long cooldown periods between motor starts may be eliminated. This reduces maintenance costs and increases the efficiency where short on-off cycles are desirable.

The embodiments of the invention in which an exclusive property or right is claimed are defined as follows:

1. An auxiliary starting system for electric motors comprising:
   fluid operated motor means;
   accumulator means for supplying an amount of fluid at high pressure to the fluid-operated motor means;
   means for connecting the output shaft of said fluid-operated motor means to transfer rotational torque to the shaft of the prime mover motor to be started; and
   switching means for reversing the fluid flow through said fluid operated motor for allowing said prime mover motor to charge said accumulator means.

* * * * *